United States Patent [19]
Malkki et al.

[11] 3,745,632
[45] July 17, 1973

[54] METHOD OF MAKING A COMBINED EXHAUST PIPE AND SILENCER

[76] Inventors: Eino Kalervo Malkki, Etela Hesperiankatu 18 A 2; Valentin Silde, 3 Linja 23 B, both of Helsinki, Finland

[22] Filed: June 21, 1971

[21] Appl. No.: 155,165

[30] Foreign Application Priority Data

June 25, 1970 Finland .......................... 1775/70

[52] U.S. Cl. .......... 29/157 R, 72/368, 113/116 UT, 113/116 Y, 181/35 C, 181/60
[51] Int. Cl. ............................................ B23p 15/26
[58] Field of Search ................. 29/157 R; 181/35 C, 181/60; 113/116 UT, 116 W, 116 Y; 72/49, 50, 368

[56] References Cited
UNITED STATES PATENTS

| | | | |
|---|---|---|---|
| 1,972,065 | 8/1934 | Noblitt | 181/35 C |
| 1,978,529 | 10/1934 | Harrah | 29/157 R |
| 3,159,239 | 12/1964 | Andrews | 29/157 R |
| 2,339,219 | 1/1944 | Crowley | 72/50 |
| 1,181,150 | 5/1916 | McMurtrie | 72/49 |
| 2,305,587 | 12/1942 | Lapp et al | 72/49 X |
| 2,786,435 | 3/1957 | Ellzey | 113/116 U |
| 3,183,695 | 5/1965 | Darner | 72/49 |
| 3,247,692 | 4/1966 | Davis | 72/49 |

FOREIGN PATENTS OR APPLICATIONS

| | | | |
|---|---|---|---|
| 859,092 | 12/1952 | Germany | 72/368 |
| 1,071,057 | 3/1956 | France | 72/49 |

Primary Examiner—Charles W. Lanham
Assistant Examiner—D. C. Reiley, III
Attorney—Richards & Geier

[57] ABSTRACT

A method of making a combined exhaust pipe and silencer for a motor vehicle includes the steps of helically bending a metal strip into a tubular form, profiling the metal strip to form a crest which acts as a screw thread and closing the metal strip with a solid seam to produce a helically seamed tubular exhaust pipe. The exhaust pipe and a suitable silencer are assembled and joined by means of the screw thread. When shaping the exhaust pipe and the silencer the diameter of the helically seamed tube is continuously changed to provide a continuous connecting part between an end of the silencer and the exhaust pipe.

4 Claims, 4 Drawing Figures

PATENTED JUL 17 1973  3,745,632

EINO KALERVO MALKKI
INVENTOR

RICHARDS + GEIER
ATTORNEYS

METHOD OF MAKING A COMBINED EXHAUST PIPE AND SILENCER

The present invention concerns an exhaust pipe with silencer, in particular of a motor vehicle, and a method for manufacturing these. Exhaust pipes and silencers have previously most commonly been made of steel tube by welding the different parts together. The outer part of the silencer has usually been made of constant diameter tube, to the ends of which planar end flanges have been attached by welding. Consequently, numerous work phases are required in the manufacturing of the exhaust pipe and silencer. The use of welded joints has restricted the application in exhaust pipes and silencers of materials more resistant to corrosion than conventionally employed materials, because welded seams without expensive protective treatment constitute points highly susceptible to corrosion, and partly for this reason the use of materials which are more corrosion resistant, such as acid-resistant steel, has not been motivated. The exhaust pipe and silencer have in fact constituted one of the weakest points in motor vehicles with regard to corrosion, and they have to be replaced, partly or totally, several times during the service life of the vehicle.

It is known in prior art to make a certain part of an engine exhaust pipe, more specifically a short section from the exhaust manifold of the engine to the conventional exhaust pipe with silencer, of metal tubing resembling helically seamed tube, which is hose-like, completely flexible. The flexibility of such helically seamed tubes has been based on a yielding, moving seam and not on their profiling, and no entire exhaust pipes with silencer have been manufactured of such tubes, nor have they comprised any helically seamed portions with changing, e.g., conically changing, diameter, which is one of the essential novelty characteristics of the present invention.

The aim of the invention is to contribute to elimination of the drawbacks pointed out above, and to accomplish an exhaust pipe with silencer in the manufacturing of which no welded joints need be used, which contributes to making economically profitable the use in exhaust pipes and silencers of more corrosion-resistant materials, such as acid-resistant steel, such as e.g. acid-resistant steel. According to the invention, the exhaust pipe with silencer is made of helically seamed, appropriately profiled tubing, which is made by machine means from metal strip e.g., by cold rolling. The present applicants have previously disclosed a machine for manufacturing helically seamed tubing, co-pending U.S. Pat. application Ser. No. 810,470, now U.S. Pat. No. 3,614,882, in which during the manufacturing process the diameter of the tube may be continuously, e.g., conically, changed. This machine renders possible the manufacturing of an exhaust tube and silencer according to the present invention.

The present invention is mainly characterized in that the exhaust pipe with silencer is manufactured, either as one entity or in parts, of helically seamed tubing whose diameter is changeable, in connection with its manufacturing by machine means, continuously, e.g., conically, in the longitudinal direction of the tube and which tube has been profiled so that the tube may be bent without risk of buckling.

The use of helically seamed tubing enables the entire exhaust pipe and silencer outer mantle to be manufactured in one piece, because by the process of helical seaming with the aid of the machine referred to above e.g., conical tube portions can be made and, therefore, e.g., the junctures of exhaust pipe and silencer may be made at the same phase of work as the other parts of the exhaust pipe and the silencer. When the helically seamed tube is given a profile such as to make it flexible, the exhaust pipe can be bent into desired shape without need of moulds or any other tools, and there is no risk of buckling.

When the exhaust pipe and silencer are assembled from parts, it is possible to profile the parts in such manner that the profile acts as a thread by means of which the different parts of the exhaust pipe and the silencer can be joined to each other by a screwed joint. In this manner also a wide range of adjustment is achieved for the lengths of exhaust pipes and silencers. The profiling also increases the cooling surface of the silencer and the resistance to flow, which as a result of the profiling can be more uniformly distributed over the entire exhaust pipe.

It has been found that for an exhaust pipe and silencer according to the present invention thinner materials than before may be used. It has been general previous practice to use steel of 1.0–2.0 mm thickness. According to the invention, better corrosion resistance than before is achieved if, for instance, acid-resistant steel (Aisi 316) of 0.5 mm thickness is used, and an exhaust pipe of lighter weight than before is then obtained.

Preliminary dynamometric measurements have unexpectedly revealed that when in a car of a given make the normal exhaust pipe and silencer were replaced with an exhaust pipe and silencer according to the present invention, the fuel consumption was lowered. The exact cause for this phenomenon is not yet understood.

The invention is described in detail with reference to the embodiment examples according to the figures in the attached drawing, yet without in any way confining the invention to these.

FIG. 1 presents an automobile exhaust pipe with silencer, manufactured from helically seamed tubing in parts.

Figure 1:
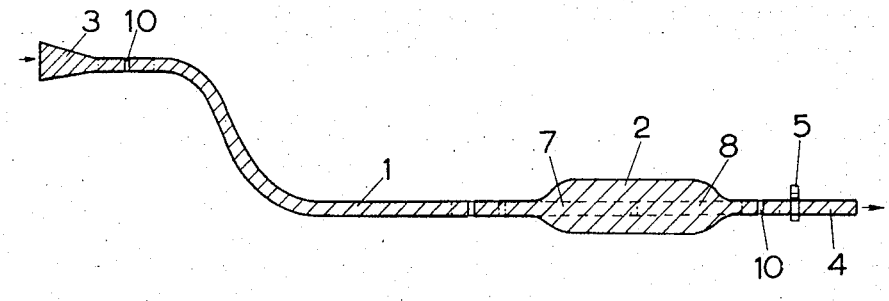

The exhaust pipe and silencer shown in FIG. 1 has been assembled from several helically seamed partial tubes. Tube 1 has been depicted in its bent form, and to this tube is connected by means of connecting pieces 10 a conical end piece, which fits together with the tube coming from the exhaust manifold. The connecting pieces 10 have been depicted as pieces capable of being screwed into the exhaust pipe tubes, but they may equally well fit upon the latter. The tube 1 is joined at its other end to the silencer 2, also by means of a connecting piece 10. The silencer is composed of the outer tube 2 of the silencer and of perforated inner tubes 7 and 8, which have been suitably closed at their ends. The outer tube 2 of the silencer has been manufactured by the helical seaming process in one piece and it has at both ends conical reduction surfaces, and on the continuation of these, connecting parts having a thickness substantially equal to that of the exhaust pipe. The outer tube 2 of the silencer is attached by means of the connecting piece 10 with a tube 4 opening into free atmosphere, for which attachment conventional clamping element 5 has been provided. There may also be several outer tubes 2 of the silencer, one abutting the next, with throttling points located between them, the latter having, for instance, the same thickness as the exhaust pipe. All the tubes mentioned above, including the connecting tubes, are profiled, helically seamed tubes.

Figure 2:
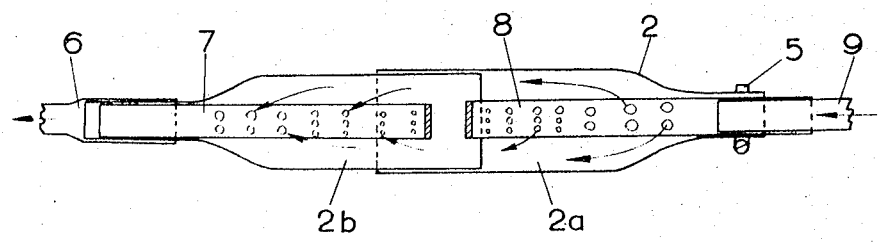
FIG. 2 shows details of the junctures between tubes of the silencer and different tubes of the exhaust pipe, in sectional presentation.

FIG. 2 shows a few examples of possible modes of attachment of the exhaust pipes and silencer tubes. The tube 9 has been shown to be screwed into the inner tube 8 of the silencer. The silencer inner tubes 7 and 8, which have been perforated, are fixed in the silencer tube 2 by screw threads. The tube 6 has been provided with a conically expanding fixing part, which attaches to the silencer tube 2 by means of the threads formed by the profile.

All the above-mentioned thread connections arise from the screw thread, caused by the profiling, which is produced at the helical seaming process. According to FIG. 2, the outer tube 2 of the silencer has been made of two parts 2a and 2b of slightly different diameters, which can be joined with each other by profile thread, and the number of such parts 2a, 2b may also be greater than two. In this manner one may achieve, in addition to adjustable length, also adjustable silencing characteristics by screwing the parts 2a and 2b more or less deeply into each other. After the outer tube 2 of the silencer has been adjusted to be appropriate in length, it is advantageous to flatten the outer tube 2 to have an oval cross section so that its smaller diameter is substantially equal to the diameter of the exhaust pipe. The silencer will then cause no reduction of the vehicle's ground clearance.

Figure 3:
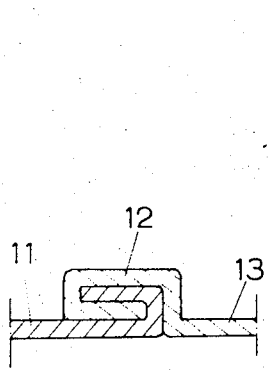
FIG. 3 shows an advantageous seam design of the helically seamed tube.
Figure 4:
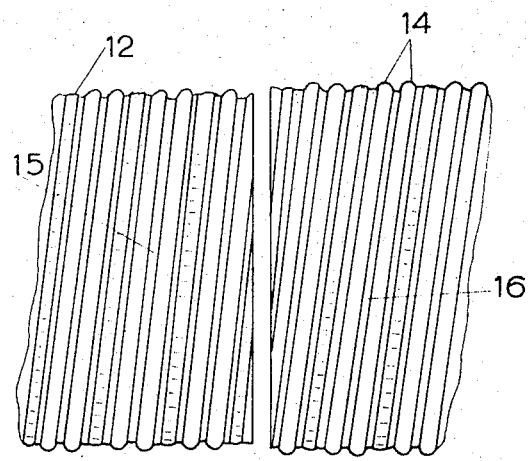
FIG. 4 shows two parts of the silencer of the exhaust pipe or of their connecting piece, which can be screwed into each other, the tubes having been provided with an undulating profile having two crests and which acts as a thread.

FIGS. 3 and 4 show details of the helically seamed tube. FIG. 3 displays an appropriate seam design 12, by which the adjacent strip turns 11 and 13 are joined together. This seam has proved to be absolutely tight. FIG. 4 shows two helically seamed tubes 15 and 16, which are attachable to each other by means of the thread formed by the profile 14, which implies, of course, that their diameters are slightly different. The tubes 15 and 16 can be screwed into each other so that their seams 12 meet. The tubes 15 and 16 have been depicted as being provided with an undulating profile having two crests, which profile may naturally have some other shape as well and may have one or several crests. The profiling has at least four important tasks from the viewpoint of the invention, which have in part been mentioned already: first, the profile acts as a screw thread by means of which the different parts of the exhaust pipe and the silencer may be attached to each other so that their lengths are adjustable; secondly, the profiling makes the tubes suitably bendable without any risk of buckling; thirdly, the profiling increases the cooling surface and the flow resistance, in some cases even to such degree that the inner tubes 7 and 8 of the silencer become unnecessary; and fourthly, the profiling, and partly also the seaming, increases the resilient properties of the exhaust pipe in the respect that the exhaust pipe will not easily suffer ruptures. Exhaust pipes and silencers produced as set forth in the invention are also quite suitable for use as replacement parts on motor vehicles, since exhaust pipes and silences of different lengths can easily be assembled from standard-sized parts and bent into the desired shape, without even requiring the use of any tools.

What we claim is:

1. The method of making a combined exhaust pipe and silencer for a motor vehicle, without the use of any welded seams, said method comprising the steps of bending helically a corrosion-resistant metal strip into tubular form, profiling the metal strip to form a crest which upon formation of a tube acts as a screw thread, closing the profiled metal strip with a solid lock seam to produce a rigid helically seamed tubular exhaust pipe, assembling and joining the exhaust pipe and a suitable silencer by means of the screw thread, and shaping the exhaust pipe and the silencer while continuously changing the diameter of the helically seamed tube at the juncture between the exhaust pipe and the silencer to provide a continuous connecting part between the exhaust pipe and the silencer.

2. Method according to claim 1, comprising steps in which
   the exhaust pipe with silencer is assembled from a plurality of parts,
   said parts are attached to each other by a threaded joint by screwing them into each other, utilizing the screw thread which is produced from the said strip profile in the helical seaming process of the tube.

3. Method according to claim 2, comprising the step of adjustment of the silencer and exhaust pipe length by screwing these into each other.

4. Method according to claim 3, comprising adjustment of the silencing properties of the silencer by screwing the outer tubes of the silencer into each other.

* * * * *